(12) United States Patent
Mazeaud et al.

(10) Patent No.: US 11,395,382 B2
(45) Date of Patent: Jul. 19, 2022

(54) METHOD FOR PARAMETERIZING A MACHINE-VISION LIGHTING DEVICE

(71) Applicant: TPL VISION UK LTD, Charing (GB)

(72) Inventors: Guillaume Mazeaud, Glencarse (GB); Jack McKinley, Edinburgh (GB); NEdko Gatev, Dundee (GB)

(73) Assignee: TPL VISION UK LTD, Charing (GB)

( * ) Notice: Subject to any disclaimer, the term of this patent is extended or adjusted under 35 U.S.C. 154(b) by 370 days.

(21) Appl. No.: 16/671,434

(22) Filed: Nov. 1, 2019

(65) Prior Publication Data
US 2020/0146117 A1 May 7, 2020

(30) Foreign Application Priority Data
Nov. 5, 2018 (FR) ...................................... 1860162

(51) Int. Cl.
*H05B 45/10* (2020.01)
*B25J 9/16* (2006.01)

(52) U.S. Cl.
CPC ............ *H05B 45/10* (2020.01); *B25J 9/1697* (2013.01)

(58) Field of Classification Search
CPC ............................... H05B 45/10; B25J 9/1697
See application file for complete search history.

(56) References Cited

U.S. PATENT DOCUMENTS

2020/0134773 A1* 4/2020 Pinter ..................... G06T 7/521

* cited by examiner

*Primary Examiner* — Georgia Y Epps
*Assistant Examiner* — Don J Williams
(74) *Attorney, Agent, or Firm* — Ronald M. Kachmarik; Cooper Legal Group LLC

(57) ABSTRACT

A method for parameterizing a machine-vision device. The method incudes the e following successive steps: a) selecting, depending on the zone of interest, a slaved lighting configuration, and recording the slaved lighting configuration in the control interface and/or applying the slaved lighting configuration; b) independently of step a), selecting an origin lighting configuration, and applying the origin lighting configuration; c) establishing an informational relationship between said origin and slaved lighting configurations and recording said relationship in the control interface so that the electronic unit commands the zone of interest to be lit in the slaved lighting configuration in response to an origin lighting configuration.

16 Claims, 2 Drawing Sheets c) determining, depending on the zone of interest, a slaved lighting configuration, and applying this configuration b) determining an origin lighting configuration, and applying the configuration a) establishing and recording an informational relationship between said origin and slaved lighting configurations currently applied

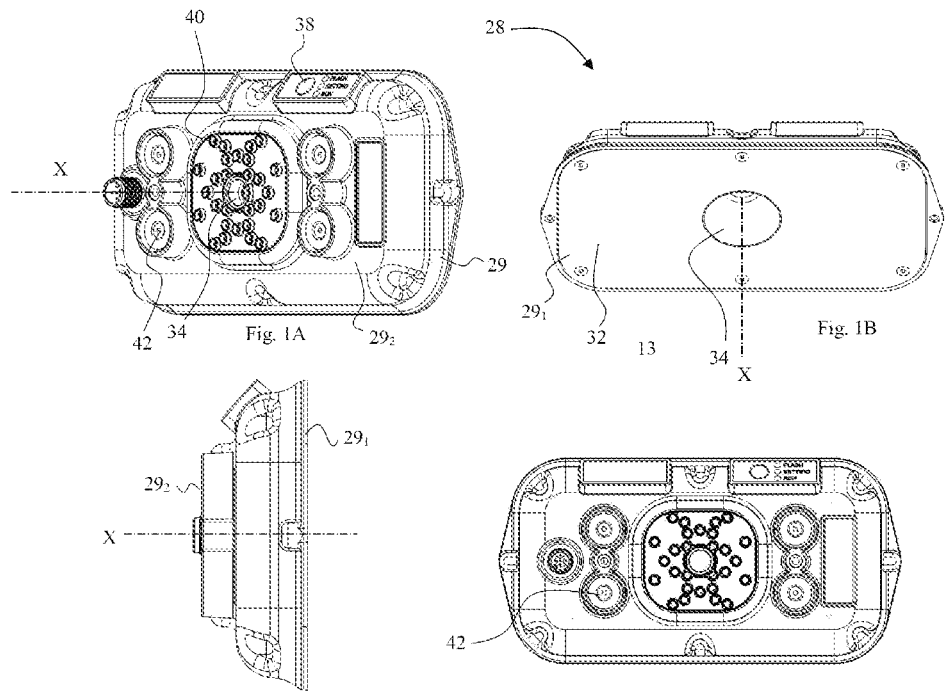
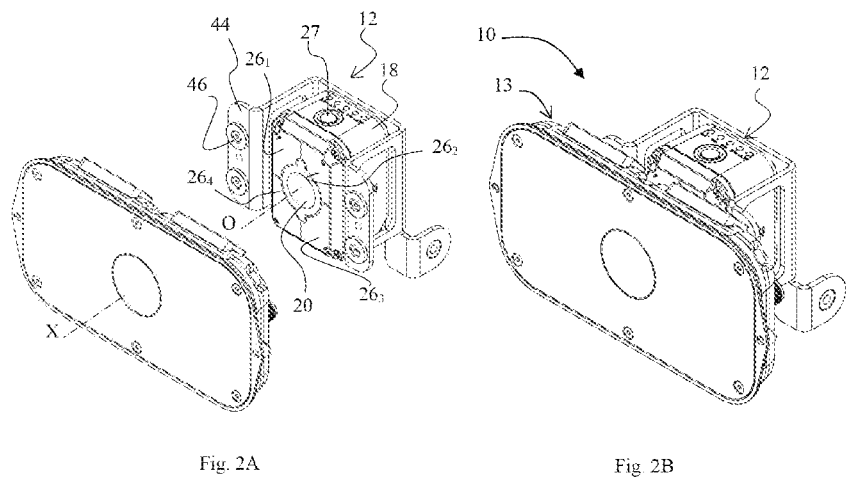

c) determining, depending on the zone of interest, a slaved lighting configuration, and applying this configuration b) determining an origin lighting configuration, and applying the configuration a) establishing and recording an informational relationship between said origin and slaved lighting configurations currently applied

METHOD FOR PARAMETERIZING A MACHINE-VISION LIGHTING DEVICE

TECHNICAL FIELD

The present invention relates to a method for parameterizing a machine-vision device.

PRIOR ART

In the industrial field, it is known to inspect objects visually in order to identify them or to verify the conformity thereof. This inspection is advantageously carried out automatically by means of a machine-vision device. Such a machine-vision device conventionally comprises light sources that light a zone of interest containing the objects to be inspected, and a camera for taking images of this zone of interest. The images are then processed by an image-analyzing software package, which may or may not be integrated into the camera.

The quality of the contrast, and therefore the robustness of the inspection, depend on the lighting configuration. The lighting may for example be directional, diffuse and indirect, coaxial, with a grazing incidence with respect to the axis of the camera, or even such as to produce silhouettes. The color of the lighting must be adapted to the objects. For example, it may be necessary to light in red objects conveyed on a blue conveyor belt, the objects thus appearing white on a black background to a monochromic camera.

Lastly, conventionally, the light sources do not provide light continuously, but do so intermittently, in the manner of a stroboscope. The light sources thus emit successive flashes of a duration equal to or slightly longer than the exposure time of the camera. This allows the moving items on the conveyor belt to be "frozen" during the acquisition of the images by the camera. This furthermore allows the potential lifetime of the light sources to be increased, in particular when they are light-emitting diodes (LEDs).

The turn-on and turn-off of the light sources is generally achieved using all-or-nothing (AON) outputs of the camera or a programmable logic controller (PLC), or even via field buses for lights equipped with an ad hoc interface, such as an ethernet, RS485, RS232, DeviceNet or Profibus interface, inter alia. These interfaces are however rare because of the high cost and complexity of the associated programming, in particular when a plurality of light sources must be controlled in coordinated sequences to emit different colors and/or different light intensities. Field buses are one solution, however have a limited reactivity that may degrade the precision of the specified turn-on sequences.

Moreover, camera systems consisting of a camera provided with integrated LED lighting do exist. The LEDs are controlled directly by the image-analyzing and configuring program integrated into the camera, thus simplifying connectivity and control problems. However, such integrated lighting only allows directional and monochromatic lighting to be provided, this limiting the ability to define a lighting configuration that is optimal for a given situation.

To respond to these problems, PCT/EP2017/074423 describes a machine-vision device comprising:
  a camera system comprising a camera and at least one origin light source; and
  a lighting device comprising:
    a control interface comprising:
      a plurality of light sensors each for capturing a respective origin light signal emitted by said origin light source and for emitting a respective sensor signal in response to the capture of said respective origin light signal;
      an electronic unit for processing said respective sensor signal, said electronic processing unit being configured so as to send, as a result of said processing, a respective control signal to at least one respective output of the electronic processing unit; and
    one or more slaved light sources, each connected to one respective output of the electronic processing unit by respective connecting means, so as to be controlled with the control signal delivered to said output.

Thus, the control interface allows external lighting to be controlled using origin light signals emitted by the origin light sources, this being particularly advantageous when the origin light sources are not designed to guarantee an optimal contrast for the processing of the image. The control interface is simple to produce and has a low bulk. It avoids complicated cabling, network connections and interface programs.

PCT/EP2017/074423 also describes a method for controlling lighting of said machine-vision device. This method includes steps consisting in:
  i) emitting origin light signals;
  ii) capturing the origin light signals emitted from various origin positions;
  iii) processing the captured origin light signals in order to deduce therefrom their origin positions and a command for one or more slaved light sources;
  iv) commanding one or more slaved light sources in accordance with the command deduced in step iii).

The processing in step iii) is carried out in the electronic processing unit, which is programmed to this end. The way in which the electronic processing unit must be programmed to ensure that the lighting delivered by the slaved light sources is satisfactory is however specific to each application. In particular, it depends on the zone of interest to be lit, this limiting the multipurposeness of the control interface. Moreover, this programming requires the operator to have undergone specific training.

There is therefore a need for a control interface, lighting device and machine-vision device of the same type as those described in PCT/EP2017/074423 but in which the electronic control unit is easier to program, and in particular can be programmed without particular training.

One aim of the invention is to meet this need.

SUMMARY OF THE INVENTION

The invention proposes a method for parameterizing a machine-vision device, said device comprising:
  a camera system comprising a camera and first and second origin light sources configured to, in an origin lighting configuration, emit first and second origin light signals, respectively;
  a lighting device comprising:
    a control interface comprising:
      first and second light sensors arranged to capture said first and second origin light signals, respectively, and to emit first and second sensor signals, respectively, in response to the capture of said first and second origin light signals, respectively;
      an electronic unit for processing said first and second sensor signals, said electronic processing unit being configured to send, as a result of said processing, a plurality of control signals to respective outputs of the electronic processing unit;

a plurality of slaved light sources, each connected to one respective output of the electronic processing unit so as to be controlled with the control signal delivered to said output in order to light a zone of interest.

Said method comprises the following successive steps:

a) selecting, depending on the zone of interest, a lighting configuration for the slaved light sources, called the "slaved lighting configuration", and recording the slaved lighting configuration in the control interface and/or applying the slaved lighting configuration;

b) independently of step a), selecting a lighting configuration for the origin light sources, or "origin lighting configuration", and applying the origin lighting configuration;

c) establishing an informational relationship between said origin and slaved lighting configurations and recording said informational relationship in the control interface so that the electronic unit commands the zone of interest to be lit in the slaved lighting configuration in response to reception, by said sensors, of origin light signals in the origin lighting configuration.

As will be seen in more detail in the rest of the description, the operator therefore searches for a slaved lighting configuration suitable for the zone of interest by testing various configurations. At the end of this search, the control interface therefore commands the slaved light sources to adopt the slaved lighting configuration that the operator has chosen. A first computer may replace the operator in this search.

Moreover, the operator selects any origin lighting configuration and applies it. A second computer, identical to or different from the first computer, may replace the operator in these operations.

The control interface then receives the origin light signals corresponding to the selected origin lighting configuration.

It is then enough for the operator to control the processing unit so that it establishes and records an informational relationship between the origin and slaved lighting configurations, for example via a simple press on a button.

In the preferred embodiment, the operator keeps the slaved light sources in the slaved lighting configuration and the origin light sources in the origin lighting configuration active simultaneously and, preferably, via the press on a button, orders the processing unit to establish and record the informational relationship between these configurations.

A method according to the invention thus allows the control interface to be simply and very rapidly programmed.

The informational relationship then allows the control interface to make the slaved light sources adopt the slaved lighting configuration each time it receives origin light signals in the origin lighting configuration. In other words, each time said origin lighting configuration is applied by the camera, the control interface commands said slaved lighting configuration.

The operator may in particular, with each of a plurality of origin lighting configurations, preferably with a preset number of origin lighting configurations, for example fewer than 100 origin lighting configurations, associate one corresponding slaved lighting configuration. Step c) thus allows, in the control interface, a set of "origin lighting configuration-corresponding slaved lighting configuration" records to be recorded. The selection of an origin lighting configuration then allows, very easily, the corresponding slaved lighting configuration to be obtained.

Preferably, to each origin lighting configuration corresponds one single slaved lighting configuration. Preferably, to each slaved lighting configuration corresponds one single origin lighting configuration.

The informational relationship between an origin lighting configuration and the corresponding slaved lighting configuration is preferably arbitrary. For example, it results only from a decision of the operator.

Moreover, apart from said informational relationship, there is no link between the origin lighting configuration and the slaved lighting configuration. It is therefore possible to obtain complex slaved lighting from a camera system that can be configured only in one or more elementary origin lighting configurations.

A method according to the invention may furthermore comprise one or more of the following optional features:

in step c), said informational relationship between the origin and slaved lighting configurations is recorded via action on a programming member of the control interface, preferably a button or a screen, preferably a button;

in step a), a plurality of slaved lighting configurations is tested, so as to find and select a slaved lighting configuration that is optimal with respect to the effectiveness of the recognition, by the machine-vision device, of objects placed in the zone of interest, for example placed on a conveyor;

in step b), the selection of the origin lighting configuration is independent of the slaved lighting configuration selected in step a), the selection of the origin lighting configuration possibly in particular being arbitrary;

in an assembled position in which the camera is fastened to the control interface, the origin light sources face one or more respective light sensors and are preferably at less than 3 cm from said respective light sensors;

each light sensor is placed so that the light that it receives originates, as regards more than 50% of its intensity, from one or more origin light sources that face it;

the slaved light sources are kept active, in the slaved lighting configuration selected in step a), during the application of the origin lighting configuration in step b) and/or until said informational relationship has been established in step c);

in step a), the slaved lighting configuration is selected from a database of slaved lighting configurations stored in the control interface;

the database of slaved lighting configurations, which is preferably stored in the control interface, comprises more than 1, more than 3, more than 7 and preferably more than 15 slaved lighting configurations and/or fewer than 1000, fewer than 500 or fewer than 100 slaved lighting configurations;

the origin light sources are adjustable by an operator independently and, in step a), to select the slaved lighting configuration, an operator adjusts at least one origin light source independently of the other origin light sources;

in step b), the origin lighting configuration is selected from a database of origin lighting configurations stored in the camera;

the database of origin lighting configurations, which is preferably stored in the camera, comprises more than 1, more than 3, more than 7 and preferably more than 15 origin lighting configurations and/or fewer than 1000, fewer than 500 or fewer than 100 origin lighting configurations;

in step c), said relationship between the applied origin and slaved lighting configurations is recorded via action on a programming member of the control interface, preferably a button or a screen, preferably a button;

said origin light sources are integrated into the camera;

the camera is fastened, preferably removably, preferably magnetically, to the control interface in a preset position, preferably by way of a holder;

the cycle of steps a) to c) is repeated in order to establish a plurality of said informational relationships suitable for recognition, by the machine-vision device, of a plurality of different objects;

the one or more slaved light sources are configured to emit flashes of a duration shorter than 10 ms and/or a light spectrum of a width narrower than 100 nm, and/or at least some of the slaved light sources are configured to emit in a domain of non-visible frequencies;

the control interface is passed through by an aperture and the optical axis of the camera is substantially aligned with the axis of the aperture, the slaved light sources being placed on the side of the control interface opposite to the camera.

The invention also relates to a control interface comprising a programming member, preferably a button, an actuation of which establishes an informational relationship between an origin lighting configuration applied by the origin light sources and a slaved lighting configuration applied by the slaved light sources controlled by the control interface.

A control interface according to the invention may further comprise one or more of the following optional features:

preferably, the plurality of slaved light sources is integrated into the control interface;

preferably, the control interface comprises a fastener for fastening the camera in a preset position in which each light sensor captures zero, one or more than one origin light signals, depending on its position, and preferably captures at least one origin light signal and preferably a single origin light signal, one origin light signal possibly reaching a plurality of sensors;

preferably, the control interface comprises a fastener for fastening the camera in a preset position, in which each origin light signal reaches only at most one signal sensor;

preferably, the fastener is deactivatable. Preferably, it is magnetic.

The invention also relates to a control kit comprising a control interface according to the invention and a holder for a camera, said holder itself being provided with a fastener for fastening to the control interface. Preferably, this fastener is deactivatable. Preferably, it is magnetic.

The invention also relates to a lighting device comprising:
a control interface or a control kit according to the invention;
a plurality of slaved light sources controlled by the control interface so as to light a zone of interest in a slaved lighting configuration.

The invention also relates to a machine-vision device comprising:
a lighting device according to the invention, and
a camera system comprising a camera and a plurality of origin light sources configured to, in an origin lighting configuration, each emit a respective origin light signal.

Preferably, the plurality of origin light sources is integrated into the camera.

Preferably, the camera is an industrial camera and comprises more than 1, preferably more than 2 and preferably more than 3 independent origin light sources, i.e. that are able to be controlled independently of one another.

Preferably, the camera comprises a camera interface designed so that an operator is able to define and apply, and preferably record in a memory of the camera, one and preferably more than one origin lighting configurations.

Preferably, an origin light signal is captured by a set of one or more sensors consisting of one or more light sensors. In one embodiment, each set of sensors receives only one origin light signal, i.e. receives light originating from a single origin light source.

The control interface, the lighting device and the machine-vision device preferably comprise one or more of the features of the control interface, of the lighting device and of the machine-vision device described in PCT/EP2017/074423.

The invention lastly relates to a device for conveying objects comprising:
one track for conveying objects, and
a control interface according to the invention, preferably a lighting device according to the invention, and preferably a machine-vision device according to the invention, the slaved light sources being suitable for illuminating a zone of interest comprising at least one segment of the track for conveying objects.

In one embodiment, the conveying device furthermore includes a sorting unit controlled by an electronic control module connected to a digitizing device of the machine-vision device, in order to sort the objects conveyed on the conveying track depending on images taken by the camera.

Definitions

By "light source", what is meant is an electrical source suitable for emitting radiation in the visible, infrared or ultraviolet range.

A "lighting configuration" is a state vector defining the conditions under which a plurality of light sources emit radiation. The values of this vector may in particular determine whether a light source is turned on or turned off, the intensity of the light that it emits, the frequency spectrum of this light and/or the lighting sequence, and in particular a frequency of emission of flashes. When a lighting configuration is "applied", said light sources emit light in accordance with this instruction. By extension, a lighting configuration also designates the lighting resulting from this application.

"To comprise" and "to include" must be interpreted nonlimitingly.

BRIEF DESCRIPTION OF THE FIGURES

Other features and advantages of the invention will become apparent on reading the following detailed description, which description makes reference to the appended drawings, in which:

FIGS. 1A-1D schematically shows a control interface according to the invention, in perspective seen from behind (FIG. 1A), in perspective seen from in front (FIG. 1B), seen from the side (FIG. 1C), and seen from behind (FIG. 1D);

FIGS. 2A and 2B show a machine-vision device employing the control interface of FIGS. 1A-1D, in demounted position (FIG. 2A) and in a position assembled (FIG. 2B) with the camera;

Figures 3, 4:
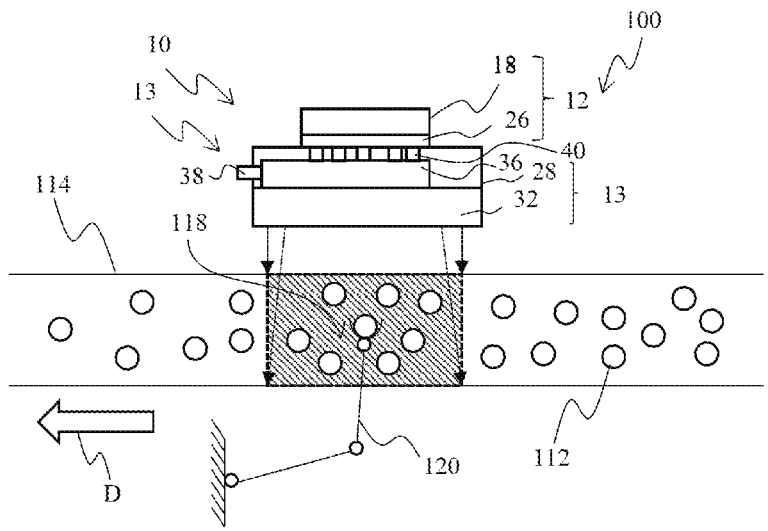
FIG. 3 illustrates an application of a machine-vision device according to the invention.
FIG. 4 shows a flowchart of a method according to the invention.

In the present description, elements that are identical or that have identical functions have been referenced with the same reference signs. For the sake of the conciseness of the description, these elements are not described for each figure.

DETAILED DESCRIPTION

Device

In one preferred embodiment, a machine-vision device 10 comprises a camera system 12 and a lighting device 13 (FIG. 2B).

The camera system 12 conventionally comprises a camera 18 (FIG. 2A).

The camera conventionally comprises an objective 20 composed of an optical lens or of a plurality of optical lenses, which are associated with an optical sensor (not shown) for capturing images of the zone of interest. The optical sensor is conventionally connected to an electronic board, in particular with a view to processing the information coming from the optical sensor and to deducing therefrom a digitized image of the zone of interest.

The camera system also comprises a plurality of origin light sources, conventionally more than 1, more than 2, more than 3 or more than 7 origin light sources. The origin light sources are preferably integrated into the camera 18. In the shown embodiment, four origin light sources $26_1$, $26_2$, $26_3$, and $26_4$ are integrated into the camera 18.

The origin light sources, conventionally light-emitting diodes, preferably each consist of a flash or any other lighting means conventionally integrated into an industrial camera.

Often, the origin light sources do not allow the zone of interest to be satisfactorily lit, i.e. lit in such a way as to allow the machine-vision device to identify and, for example, sort objects present in the zone of interest.

Preferably, a plurality, preferably more than 3, more than 7, more than 15, and preferably more than 63 and/or fewer than 1000, fewer than 500 or fewer than 100 origin lighting configurations may be adopted by the camera system. For example, with three origin light sources, it is possible to define the following configurations (1,0,0), (0,1,0), (0,0,1), (1,1,0), (1,0,1), (0,1,1) and (1,1,1), "1" and "0" meaning that the origin light source is turned on and turned off, respectively, the three numbers designating the three origin light sources.

Preferably, the camera system comprises a camera interface 27, for example a touch screen and/or buttons, a processor and a computational memory that are configured to permit one and preferably more than one origin lighting configurations to be recorded and a recorded origin lighting configuration to be selected. Conventional means may be employed to this end.

The lighting device comprises a control interface 28 and a plurality of slaved light sources 32 (FIGS. 1A-1D).

The slaved light sources, which are different from the origin light sources, are slaved to the origin light sources, the light that they emit depending directly and preferably exclusively on the light emitted by the origin light sources.

In one preferred embodiment, the control interface 28 comprises a casing 29 having a front face $29_1$ and a back face $29_2$. An aperture 34 of axis X, which is preferably circular, and preferably of radius larger than 12 mm and/or smaller than 30 mm, passes through the casing between the front and back faces.

All of the slaved light sources 32, which are preferably LEDs or groups of LEDs operating synchronously, are fastened to the front face. All of the slaved light sources 32 may be removably mounted on the control interface. Preferably, they are integrated into the control interface.

All of the slaved light sources may for example comprise four groups of integrated multicolor LEDs able to emit a red, green or blue color when turned on, this allowing at least $2^3 \times 2^4 = 8 \times 16 = 128$ different slaved lighting configurations to be produced. The intensity of each group of LEDs may be adjustable, this allowing the number of slaved lighting configurations to be multiplied. The choice of the slaved light sources turned on and of the intensity and of the spectrum of the radiation that they emit thus allows very complex lighting to be produced.

In one embodiment, slaved light sources may also emit at non-visible frequencies, for example in the infrared or ultraviolet.

Preferably, a plurality, preferably more than 2, more than 3, more than 7 and preferably more than 15 slaved lighting configurations may be adopted by all of the slaved light sources. In each slaved lighting configuration, the way in which a slaved light source operates is preferably defined by a triplet (on or off state, intensity of the radiation, light spectrum of the emitted radiation). The set of these triplets, determined for all of the slaved light sources, may thus define a slaved lighting configuration.

Preferably, the slaved lighting configurations are recorded in a computational memory of the control interface. Also preferably, the control interface comprises a programming interface 38, for example a touch screen and/or one or more buttons, a processor and a computational memory that are configured to permit one and preferably more than one slaved lighting configurations to be recorded and a recorded slaved lighting configuration to be selected. Conventional means may be employed to this end.

Preferably, the programming interface is configured so that the selection of a slaved lighting configuration provokes the application of this configuration. Preferably, the programming interface is configured so that the operator is able to successively command the application of various slaved lighting configurations, for example via a plurality of successive presses on a button of the programming interface 38.

Preferably, in a slaved lighting configuration, preferably in each slaved lighting configuration, at least two slaved light sources 32 are configured to emit different light spectra, and preferably different colors.

Preferably, no slaved light source lights the camera system directly.

The back face $29_2$ bears a set of light sensors 40 that are intended to receive origin light signals emitted by the origin light sources of the camera in an assembled position of the camera, as shown in FIG. 2B. Depending on the camera, each light sensor 40 may receive 0, 1 or more than one origin light signals.

The arrangement of the light sensors 40 allows at least some and preferably all of the origin lighting configurations producible with the origin light sources to be identified by the control interface.

The number and arrangement of the light sensors 40 are preferably set so that the control interface is able to be used with various types of industrial cameras.

The light sensors are preferably configured to detect only a light spectrum of a width narrower than 100 nm, preferably narrower than 50 nm, and preferably substantially centered (+/−20 nm) on a discrete wavelength chosen from 470 nm, 525 nm, 635 nm, 660 nm, 850 nm, and 880 nm.

The back face $29_2$ also comprises interface fasteners 42, which are preferably manually deactivatable, and preferably magnetic, allowing the camera to be fastened in a preset assembled position.

Preferably, the assembled position is defined so that at least some and preferably all of the origin light sources face one or more respective light sensors and, preferably, are less than 3 cm, preferably less than 2 cm, preferably less than 1 cm, and preferably right next to said one or more respective light sensors, so as to limit the loss of light and luminous interactions with the environment.

Preferably, each light sensor is placed so that the light that it receives originates, as regards more than 50%, preferably more than 70%, preferably more than 90% and preferably substantially 100% of the intensity thereof, from one or more origin light sources that face it.

Preferably, each origin light source delivers light exclusively to one or more light sources that are specific thereto, i.e. that receive substantially no light from other origin light sources.

Preferably, no origin light source lights the zone of interest.

Preferably, the slaving of the slaved light sources depends substantially only on the light emitted by the one or more origin light sources. In particular it substantially does not depend on the light emitted by the one or more slaved light sources.

The slaving of the slaved light sources leads their operating conditions to be defined depending on the light emitted by the origin light sources, and preferably exclusively depending on the light emitted by the origin light sources.

The casing 29 contains an electronic unit 36 that is connected to the light sensors 40 and to the slaved light sources 32. The electronic processing unit 36 processes the signals emitted as output by the light sensors 40 and converts them into control signals for the slaved light sources 32.

The electronic processing unit comprises conventional computing means, a conventional memory and conventional communicating means. It preferably comprises an integrated circuit, in particular a programmable logic circuit, preferably a programmable gate array, a computational memory and electronic communicating means for communicating with the light sensors and the slaved light sources, and with the programming interface 38.

Preferably, the slaved light sources are controlled by the electronic processing unit to emit intermittently, and preferably to emit flashes of a duration shorter than 10 ms, preferably shorter than 3 ms and preferentially shorter than 200 μs and/or a light spectrum of a width narrower than 100 nm, and preferably narrower than 50 nm. Advantageously, the intermittent lighting avoids the creation of blur in images during the movement of parts.

Preferably, the electronic processing unit is configured to independently control more than 3, more than 7, more than 15 or more than 127 slaved light sources.

Preferably, a control signal sets a light intensity and/or a radiation spectrum (color, UV, etc.) for the light to be produced by the slaved light source that it receives.

The programming interface 38 is configured so as to allow an operator to record in the control interface an informational relationship between the origin and slaved lighting configurations that are currently being applied.

Operation

The operation of the device follows directly from the above.

Prior to operational implementation, the operator or the manufacturer of the interface may have programmed and recorded one or preferably more slaved lighting configurations in the control interface, for example a configuration for detecting tomatoes, a configuration for detecting carrots and a configuration for detecting radishes. Preferably, each configuration is associated with a label, for example "tomatoes", "carrots" and "radishes", and this label is displayed by the programming interface when the configuration is applied. These labels facilitate the selection of a slaved lighting configuration by the operator.

Prior to the operational implementation, the operator or the manufacturer of the camera may have programmed one or preferably more than one origin lighting configurations in the camera, for example a configuration with all the origin light sources turned on, a configuration with only origin light sources $26_1$ and $26_2$ turned on, a configuration with only origin light sources $26_1$ and $26_3$ turned on, a configuration with only origin light sources $26_2$ and $26_3$ turned on, a configuration with only origin light source $26_1$ turned on, a configuration with only origin light source $26_2$ turned on, and a configuration with only origin light source $26_3$ turned on.

Preferably, each configuration is associated with a label, for example "1", "2", "3", "4", "5", "6", and "7" for the above configurations, and this label is displayed on the camera interface 27 when the configuration is applied. These labels facilitate the selection of an origin lighting configuration by the operator.

The control interface is parameterized in steps a) to c), in real time (FIG. 4):

The operator firstly fastens the camera to the holder 44, then the holder 44 to the control interface by means of the fasteners 42 and 46. The optical axis O of the camera is then substantially aligned with the axis X of the aperture 34 and the origin light sources $26_1$, $26_2$, $26_3$, and $26_4$ of the camera are right next to the respective light sensors 40. The sensors in question depend on the type of camera. The other sensors face the camera and are substantially blocked by the latter.

The operator then positions the camera-control interface assembly so that the camera observes the zone of interest through the aperture of the control interface and so that the slaved light sources 32 are oriented toward the zone of interest.

In step a), the operator then tests various slaved lighting configurations. Preferably, the slaved lighting configurations are recorded in the control interface and may be selected. In one embodiment, the control interface allows the operator to personalize a slaved lighting configuration, and preferably to determine, for each of a plurality of slaved light sources, an intensity and/or a radiation spectrum, a color for example. In one embodiment, a slaved lighting configuration is also characterized by a lighting sequence, and for example by a frequency of emission of light by the slaved light sources.

For example, in a first slaved configuration, 20% of the slaved light sources emit red light, with an intensity of 30%, 70% of the slaved light sources emit blue light, with an intensity of 50%, and 10% of the slaved light sources emit yellow-blue light, with an intensity of 80%.

The operator applies and examines the effect of this slaved lighting configuration on the zone of interest. For example, he measures the effectiveness of the recognition, by the machine-vision device, of objects placed on a conveyor.

Next, the operator selects and applies a second slaved lighting configuration, this activating the slaved light sources accordingly. For example, in the second slaved lighting configuration, 100% of the slaved light sources emit red light, with an intensity of 50%. He examines the effect of this second slaved lighting configuration on the zone of interest and compares the effect of the obtained lighting with the first slaved lighting configuration.

He repeats these test operations until an optimal slaved lighting configuration is found and selected.

Alternatively, the operator may select the optimal slaved lighting configuration from a database of slaved lighting configurations recorded beforehand in the control interface, as described above.

In one embodiment, he keeps the slaved light sources in the optimal slaved lighting configuration that he has selected. There is then no need to record it in the control interface.

He may alternatively record in the control interface, by means of the programming interface, the optimal slaved lighting configuration that he has selected. There is then no need to keep the slaved light sources active, in the optimal slaved lighting configuration.

In step b), before or after step a), the operator selects and applies an origin lighting configuration, preferably chosen from a set of origin lighting configurations recorded in a memory of the camera. The operator may choose any origin lighting configuration. Preferably, he chooses an available origin lighting configuration, i.e. one that has not yet been associated with a slaved lighting configuration. In one embodiment, the camera interface informs the operator of the availability of an origin lighting configuration. For example, he chooses a configuration in which only origin light sources $26_1$ and $26_2$ are turned on.

In step c), the operator then establishes an informational relationship between the selected optimal slaved lighting configuration and the selected origin lighting configuration, for example by pressing on a button of the programming interface of the control interface. The processing unit then records this relationship between the optimal slaved lighting configuration that was recorded or that is active on the one hand, and the origin lighting configuration that is active on the other hand.

Subsequently, each time the selected origin lighting configuration is applied by the camera, the control interface will command the optimal slaved lighting configuration.

Preferably, when the operator selects an origin lighting configuration, the programming interface informs him whether this origin lighting configuration is already informationally related to a slaved lighting configuration, and, where appropriate, indicates thereto the objects (in the zone of interest) for which this slaved lighting configuration is optimal. the selection of an origin lighting configuration is facilitated thereby.

As should now be clear, parameterization of the machine-vision device in situ according to the invention is particularly advantageous because it allows the lighting to be adapted to the specific environment in which the camera is used, and in particular allows the ambient luminous environment to be taken into account.

A simple change of origin lighting configuration in particular allows a complex change in the slaved lighting configuration to be obtained, and therefore the lighting to be very rapidly adapted, without complex programming, to a change in the zone of interest. For example, in case of modification of the conveyed object (tomatoes, carrots, radishes), the operator may adapt the lighting of the conveyor precisely and rapidly, without particular training, by selecting the corresponding origin lighting configuration on the camera.

Of course, the order of the operations could be different. In particular, the origin lighting configuration may be selected before the slaved lighting configuration.

Example of an Application

FIG. 3 schematically illustrates a device 100 for industrial conveyance of objects 112. This conveying device 100 comprises a conveyor track 114 conveying the objects 112, tomatoes for example, in the direction D. The conveyor track 114 is for example a conveyor belt. The conveyor device 100 comprises a machine-vision device 10 according to the invention, the lighting device 13 of which lights a zone of interest 118 formed by a segment of the conveyor track 114, which is passed through by the objects 112.

The camera 18 of the machine-vision device is connected to a computing unit (not shown), often a microcomputer or a system with an integrated processor (such as a DSP), allowing, using an image-processing software package, the objects present in the captured image and not meeting a sorting criterion to be determined.

The conveyor device 100 further comprises a sorting unit 120 for removing, from the conveyor track 114, the selected objects 112, for example the inspection of which by the machine-vision device revealed a defect. In the present case, this sorting unit consists of a movable arm 120 for removing the objects 112 from the conveyor track 114.

Origin light signals are emitted by the origin light sources 26 of the camera system 12, for example in origin lighting configuration "2". These origin light signals are captured by the light sensors 40 of the control interface 28. The signals emitted by the light sensors in response to the reception of these origin light signals are processed in order to deduce therefrom control signals for one or more slaved light sources 32. The latter are controlled depending on the informational relationship established with the origin light sources 26, as described above, this allowing a slaved lighting configuration that is optimal for the sorting of tomatoes to be applied.

An image of the zone of interest 118 is then captured by the camera system 12. The acquired image is then interpreted, in a way known per se, in order to deduce therefrom information on the conveyed objects passing through the zone of interest 118. Objects that do not meet the sorting criterion may then be sorted.

If the objects 112 change and the tomatoes are replaced by carrots, it is enough for the operator to modify the origin lighting configuration, by selecting origin lighting configuration "3", to instantaneously obtain, without programming, lighting that is optimal for the sorting of carrots, for the camera used and in the specific environment in which it is used.

If no slaved lighting configuration recorded in the control interface is suitable, for example because the objects to be sorted are endives, the operator modifies "by hand" the parameters of the slaved light sources until an optimal slaved lighting configuration is found, then associates it with an origin lighting configuration, as described above.

As should now be clear, the invention provides a simple and flexible solution allowing optimal adaptation of lighting whatever the environment of use.

In particular, there is an independence between the nature of the lighting of the origin light sources and that of the lighting of the slaved light sources, so that origin light sources may be very simple, for example simple flashes, and lead to the generation of very complex lighting, perfectly suitable for the lit objects.

The invention is not limited solely to the examples that have just been described and has many variants that will appear obvious to those skilled in the art. In particular, applications are not limited to an industrial conveying device.

The invention claimed is:

1. Method for parameterizing a machine-vision device, said machine-vision device comprising:
- a camera system comprising a camera and first and second origin light sources configured to, in an origin lighting configuration, emit first and second origin light signals, respectively;
- a lighting device comprising:
  - a control interface comprising:
    - first and second light sensors arranged to capture said first and second origin light signals, respectively, and to emit first and second sensor signals, respectively, in response to the capture of said first and second origin light signals, respectively;
    - an electronic unit for processing said first and second sensor signals, said electronic processing unit being configured to send, as a result of said processing, a plurality of control signals to respective outputs of the electronic processing unit;
  - a plurality of slaved light sources, each connected to one respective output of the electronic processing unit so as to be controlled with the control signal delivered to said output in order to light a zone of interest;

said method comprising the following successive steps:
- a) selecting, depending on the zone of interest, a lighting configuration for the slaved light sources, called the "slaved lighting configuration", and recording the slaved lighting configuration in the control interface and/or applying the slaved lighting configuration;
- b) independently of step a), selecting a lighting configuration for the origin light sources, or "origin lighting configuration", and applying the origin lighting configuration;
- c) establishing an informational relationship between said origin and slaved lighting configurations and recording said informational relationship in the control interface so that the electronic unit commands the zone of interest to be lit in the slaved lighting configuration in response to reception, by said sensors, of origin light signals in the origin lighting configuration.

2. Method according to claim 1, wherein, in step c), said informational relationship between the origin and slaved lighting configurations is recorded via action on a programming member of the control interface.

3. Method according to claim 1, wherein, in step a), a plurality of slaved lighting configurations is tested, so as to find and select a slaved lighting configuration that is optimal with respect to the effectiveness of a recognition, by the machine-vision device, of objects placed in the zone of interest.

4. Method according to claim 1, wherein, in step b), the selection of the origin lighting configuration is independent of the slaved lighting configuration in step a).

5. Method according to claim 1, wherein, in an assembled position in which the camera is fastened to the control interface, the origin light sources face one or more respective light sensors and are at less than 3 cm from said respective light sensors.

6. Method according to claim 1, wherein each light sensor is placed so that the light that it receives originates, as regards more than 50% of its intensity, from one or more origin light sources that face it.

7. Method according to claim 1, wherein the slaved light sources are kept active, in the slaved lighting configuration selected in step a), during the application of the origin lighting configuration in step b) and/or until said informational relationship has been established in step c).

8. Method according to claim 1, wherein:
- in step a), the slaved lighting configuration is selected from a database of slaved lighting configurations stored in the control interface;

and/or

- in step b), the origin lighting configuration is selected from a database of origin lighting configurations stored in the camera.

9. Method according to claim 1, wherein, the origin light sources are adjustable by an operator independently and, in step a), to select the slaved lighting configuration, an operator adjusts at least one origin light source independently of the other origin light sources.

10. Method according to claim 1, wherein said origin light sources are integrated into the camera and/or the slaved light sources are integrated into the control interface.

11. Method according to claim 1, wherein, in the slaved lighting configuration, at least two slaved light sources are configured to emit different light spectra.

12. Method according to claim 1, wherein the camera is fastened, preferably magnetically, to the control interface in a preset position.

13. Method according to claim 1, wherein the cycle of steps a) to c) is repeated in order to establish a plurality of said informational relationships suitable for recognition, by the machine-vision device, of a plurality of different objects.

14. Method according to claim 1, wherein the one or more slaved light sources are configured to emit flashes of a duration shorter than 10 ms and/or a light spectrum of a width narrower than 100 nm, and/or wherein at least some of the slaved light sources are configured to emit in a domain of non-visible frequencies.

15. Method according to claim 1, wherein the control interface is passed through by an aperture and the optical axis of the camera is substantially aligned with the axis of the aperture, the slaved light sources being placed on the side of the control interface opposite to the camera.

16. Device for conveying objects, comprising at least:
- one track for conveying objects, and
- one machine-vision device parameterized using a method according to any one of the preceding claims, the slaved light sources being suitable for lighting at least one segment of the track for conveying objects.

* * * * *